Patented Jan. 25, 1949

2,459,891

UNITED STATES PATENT OFFICE 2,459,891

PRESSURE SENSITIVE ADHESIVE MASS

William L. Nelson, Highland Park, and Otto R. Sinnig, New Brunswick, N. J., assignors to Johnson & Johnson, a corporation of New Jersey No Drawing. Application July 22, 1944, Serial No. 546,218

5 Claims. (Cl. 260—33.6)

This invention relates to pressure-sensitive adhesive masses particularly suitable for use in surgical and industrial adhesive tapes.

Heretofore, it has been customary to make pressure-sensitive adhesive tape masses with rubber as the elastomeric base, a resinous material and, in some cases, a filler and a plasticizer. The elastomer provides a pressure-sensitive cushion and the cohesive strength necessary to minimize the effect of normal changes in temperature as well as offsetting or depositing of the mass upon the surface to which the tape is applied. The resinous material provides the necessary adhesion or tack. The filler and plasticizer serve to extend the mass and modify its firmness and tacky character.

Rubber is a natural material. It is subject to much variation in quality with the result that it renders difficult the control of uniformity in the products made therefrom. This fact, coupled with current rubber shortages, has stimulated a search for synthetic materials to take the place of rubber in pressure-sensitive adhesive masses.

Among the currently available rubbery materials or elastomers is a butadiene-styrene copolymer manufactured in this country as GR—S. By itself, GR—S does not have the requisite cohesive strength for a good pressure-sensitive adhesive mass, particularly if applied to a tape backing in relatively heavy coats, say of the order of 3 to 6 ounces per square yard. Masses made with GR—S are deficient in tacky properties regardless of the tackifying resins mixed within. Such masses are prone to "legging," a characteristic which results from the weak internal strength of masses containing GR—S as substantially the sole elastomeric constituent.

However, it has been discovered, in accordance with the instant invention, that if GR—S is mixed in suitable proportions with polyisobutylene of relatively high molecular weight there will result a satisfactory elastomeric base for a pressure-sensitive adhesive mass.

Polyisobutylene, which is relatively strong and tough, suitably combined with GR—S, imparts to a pressure-sensitive adhesive mass the cohesive strength which otherwise is lacking if GR—S is used alone. The GR—S polyisobutylene mass is superior to rubber masses in many respects, particularly in aging qualities and in the uniformity that may be obtained.

Standard GR—S having a Mooney value within the range of 45 to 60 may be used. It may be obtained commercially with or without an anti-oxidant. Preference is had for GR—S ("Stalite") if the mass is for surgical tapes. GR—S ("Stalite") contains Stalite which is a non-staining non-irritating anti-oxidant. It is also preferred that the GR—S be partially or semi-cured.

The preferred polyisobutylene has a molecular weight between 80,000 to 120,000, the molecular weight selected depending upon the plasticity desired in the mass, since in general the lower the plasticity, the softer and tackier is the adhesive mass made therefrom. Polyisobutylene is sold commercially under the trade-mark "Vistanex Polybutene" in three grades, B–80, B–100, and B–120, representing respectively the molecular weights 80,000, 100,000 and 120,000. It is also sold commercially under the trade-mark "Synthetic 100."

It has been found that the plasticity of commercial polyisobutylene in the different stated molecular weights, varies in irregular distribution as follows: 80,000 molecular weight, from about 2.6 mm. to 3.6 mm., with an average of about 3.2 mm.; 100,000 molecular weight from about 2.8 mm. to 4.0 mm., with an average of about 3.5 mm.; and 120,000 molecular weight from about 3.8 mm. to 4.2 mm., with an average of about 4.0. These plasticity values are those determined with a modified Williams plastometer and represent the thickness under compression of 2 gram cylindrical samples having a diameter of ⅝ inches when subjected to a compressional load of 5,000 grams for 14 minutes at 100° C. While masses may be made in accordance with the invention with polyisobutylene as it is purchased commercially, if utmost uniformity is desired, the commercial grades may be blended to a desired plasticity. For example, when it is desired to use a polyisobutylene of 80,000, 100,000 or 120,000 molecular weight, blends may be used in which the plasticity has been adjusted to about 3.2 mm., 3.5 mm., and 4.0 mm., respectively. It will be understood, of course, that a desired plasticity may involve the blending of different commercial grades of polyisobutylene.

The amount of GR—S should be in excess of the polyisobutylene, the preferred masses containing from 20% to 35% of GR—S and from 5% to 15% of polyisobutylene on a weight basis.

The tackifying resins should be compatible with the elastomeric base material. Within this limitation any suitable tackifying agent will suffice although for surgical tapes non-irritating resins are preferred. In the latter category there may be mentioned glycerol ester of hydrogenated abietic acid, B-pinene polymer, and coumarone-indene resins, and their derivatives. A suitable glycerol ester of hydrogenated abietic acid is manufactured and sold, under the trade-mark "Staybelite Ester #10". A suitable B-pinene polymer is sold under the trade-mark "Piccolyte." Piccolyte is made in a wide range of melting points. Those preferred are resins with melting points in the range of 85° to 115° C., known as Piccolytes S—85, S—100, and S—115. The tackifying resins as a rule will constitute from 5% to 20% of the weight of the mass.

Suitable plasticizers include relatively low molecular weight polyolefins, high viscosity white mineral oil, and petrolatum. Polyolefins satisfactory for the purpose may be obtained under the trade-marks "Vistac #1," "Vistac #2," "Vistac A," and "Vistac P." Vistacs #1 and #2 are high viscosity, liquid, low molecular weight polyisobutylenes; Vistac A is a pale amber high viscosity coplymer of hydrocarbon and resin forming materials, Vistac P is a pure petroleum hydrocarbon polymer having a high viscosity index, as high or somewhat higher than Vistacs #1 and #2. A suitable heavy mineral oil may be obtained under the trade-mark "Primol D." When petrolatum is used a purified petroleum jelly is preferred. For best results, a combination of a polyolefin with a mineral oil or petrolatum is suggested. Excellent adhesive masses of the type herein contemplated have been made using a plasticizer in the range of 10% to 25% of the weight of the mass.

Any of the usual fillers may be used although for surgical adhesive tape, zinc oxide, titanium dioxide, and hydrated alumina have been found most satisfactory. Hydrated alumina may be obtained in various grades. One grade receives no special treatment whereas other grades are surface coated with stearic acid or other fatty substances. Any grade may be used although the treated variety is employed when it is desired to take advantage of the slight softening and modifying effect the fatty coating substances have on the character of the mass. The fillers mentioned may be used alone or in combination but in most instances at least some zinc oxide is desirable since it facilitates curing. When a filler is present, it will usually constitute from 20% to 35% of the weight of the mass.

Antioxidents improve the aging characteristics of the mass. A small percentage of "Santovar" (an alkylated polyhydroxyl phenol) may be used for this purpose.

As previously stated, the best results are obtained by partially curing the GR—S in the elastomeric base. Suggested curing agents or accelerators include "Tetrone" (ditetramethylene-thiuram-tetrasulfide), "Tetrone A" (dipentamethylene-thiuram-tetrasulfide), "Rotax" (mercaptobenzothiazole) and sulfur. Tetrone, Tetrone A, and Rotax may be used alone or in combination with each other or with sulfur.

A few examples of pressure-sensitive adhesive masses made in accordance with the instant invention are given below, by way of illustration. The figures are in percentages by weight.

Example I

| | |
|---|---|
| Butadiene-styrene copolymer (GR—S) | 23.75 |
| Polyisobutylene 100,000 | 10 |
| B-pinene polymer (Piccolyte S-100) | 10 |
| Vistac #1 | 15 |
| High viscosity mineral oil | 7.5 |
| Hydrated alumina | 26.65 |
| Titanium dioxide | 5 |
| Zinc oxide | 1.25 |
| Sulfur | .1 |
| Rotax | .25 |
| Santovar | .5 |

Example II

| | |
|---|---|
| Butadiene-styrene copolymer (GR—S) | 30 |
| Polyisobutylene 100,000 | 5 |
| B-pinene polymer (Piccolyte S-100) | 12 |
| Vistac #1 | 10 |
| High viscosity mineral oil | 6 |
| Zinc oxide | 36.1 |
| Sulfur | .1 |
| Rotax | .3 |
| Santovar | .5 |

Example III

| | |
|---|---|
| Butadiene-styrene copolymer (GR—S) | 23.75 |
| Polyisobutylene 100,000 | 10 |
| B-pinene polymer (Piccolyte S-100) | 10 |
| Vistac #2 | 15 |
| High viscosity mineral oil | 7.5 |
| Hydrated alumina | 26.9 |
| Titanox A | 5 |
| Zinc oxide | 1.25 |
| Tetrone | .1 |
| Santovar | .5 |

Example IV

| | |
|---|---|
| Butadiene-styrene copolymer (GR—S) | 30 |
| Polyisobutylene 100,000 | 5 |
| B-pinene polymer (Piccolyte S-115) | 12 |
| Vistac #1 | 10 |
| High viscosity mineral oil | 5 |
| Zinc oxide | 37.2 |
| Tetrone | .2 |
| Rotax | .1 |
| Santovar | .5 |

Example V

| | |
|---|---|
| Butadiene-styrene copolymer (GR—S) | 28.5 |
| Polyisobutylene 100,000 | 5 |
| Glyceryl ester of hydrogenated abietic acid | 20 |
| Zinc oxide | 31.1 |
| Vistac #2 | 10 |
| High viscosity mineral oil | 5 |
| Tetrone A | .4 |

Example VI

| | |
|---|---|
| Butadiene-styrene copolymer (GR—S) | 23.75 |
| Polyisobutylene 80,000 | 10 |
| B-pinene polymer (Piccolyte S-100) | 10 |
| Vistac #2 | 15 |
| High viscosity mineral oil | 7.5 |
| Hydrated alumina | 26.9 |
| Titanium dioxide | 5 |
| Zinc oxide | 1.25 |
| Tetrone | .1 |
| Santovar | .5 |

In manufacturing an adhesive tape, the materials comprising the mass are first suitably compounded and then applied to the backing. A typical compounding procedure is as follows:

The GR—S (butadiene-styrene copolymer) and the polyisobutylene are sheeted together on the rolls of a mixing mill. The zinc oxide and accelerator are then added and mixed, whereupon the polyolefin and a portion of the filler are added and worked in to form a sheet. The rolls are then raised to a temperature at which the resins to be used will soften and stick to the rolls. In the case of Piccolyte S-100, this temperature is about 200° F., although, as will be apparent to those schooled in the art, this temperature will vary dependent upon the resin used. The resin plasticizer and the balance of the filler are then added. Steam is then admitted to the rolls of the mill and the mass uniformly mixed. At this point, the temperature of the mill rolls is considerably higher than 200° F., so that a partial cure is effected. The partial cure of the GR—S results in a mass which is firm, non-stringy, and has good cohesive strength. A partial cure is preferred, since it has been found that GR—S is easily overcured and will produce a pressure-sensitive adhesive relatively non-tacky and of poor cohesive strength. If desired, the GR—S may be cured to the proper degree on a mill or in an oven before compounding is effected. However, it is more economical to effect the cure during the compounding process since in this way a substantial amount of time is saved.

The improved masses may be used with backings of fibrous or non-fibrous, woven or non-woven materials, or of any other suitable type of material. They may be applied to the backings either by calendering or solvent spreading.

The invention has been described in its preferred form and many modifications thereof are included within its spirit. It is to be understood, therefore, that the invention is limited only by the prior art and the scope of the appended claims.

What we claim is:

1. As a spreadable pressure sensitive adhesive mass a mixture of 20–35% partially cured, rubbery butadiene-styrene copolymer; 5–15% polyisobutylene of a molecular weight of 80,000 to 120,000; 5 to 20% tackifying resin; 10 to 25% of a plasticizer composed of a major amount of low molecular weight, high viscosity liquid polyisobutylene and a minor amount of a high viscosity mineral oil; and 20 to 35% of a filler.

2. As a spreadable pressure sensitive adhesive mass a mixture of 20–35% partially cured, rubbery butadiene-styrene copolymer; 5–15% polyisobutylene of a molecular weight of 80,000 to 120,000; 5 to 20% B-pinene polymer as a tackifying resin; 10 to 25% of a plasticizer composed of a major amount of low molecular weight, high viscosity liquid polyisobutylene and a minor amount of a high viscosity mineral oil; and 20 to 35% of a filler.

3. As a spreadable pressure sensitive adhesive mass a mixture of 20–35% partially cured, rubbery butadiene-styrene copolymer; 5–15% polyisobutylene of a molecular weight of 80,000 to 120,000; 5 to 20% tackifying resin; 10 to 25% of a plasticizer composed of a major amount of low molecular weight, high viscosity liquid polyisobutylene and a minor amount of a high viscosity mineral oil; and 20 to 35% of a filler; said butadiene-styrene co-polymer having a Mooney value of from 45 to 60.

4. A pressure sensitive adhesive tape comprising a base coated with an adhesive mass according to claim 1.

5. A pressure sensitive adhesive tape comprising a base coated with an adhesive mass according to claim 2.

WILLIAM L. NELSON.
OTTO R. SINNIG.

REFERENCES CITED

The following references are of record in the file of this patent:

UNITED STATES PATENTS

| Number | Name | Date |
|---|---|---|
| 2,142,039 | Abrams | Dec. 27, 1938 |
| 2,202,363 | Wiezevich | May 28, 1940 |
| 2,269,712 | Drew | Jan. 13, 1942 |
| 2,319,959 | Tierney | May 25, 1943 |
| 2,331,894 | Drew | Oct. 19, 1943 |
| 2,332,265 | Schmidt | Oct. 19, 1943 |
| 2,349,508 | Mack | May 23, 1944 |
| 2,366,219 | Soday | Jan. 2, 1945 |
| 2,379,318 | Safford | June 26, 1945 |

FOREIGN PATENTS

| Number | Country | Date |
|---|---|---|
| 705,104 | Germany | Apr. 17, 1941 |

OTHER REFERENCES

Cohan, Ind. & Eng. Chem. Analytical, ed. Jan. 15, 1944, vol. 16, No. 1, pages 15 and 18.